US010541944B1

United States Patent
Nelson et al.

(10) Patent No.: US 10,541,944 B1
(45) Date of Patent: Jan. 21, 2020

(54) HIGH INTEGRITY AFDX SWITCHES

(71) Applicant: Rockwell Collins, inc., Cedar Rapids, IA (US)

(72) Inventors: Brent J. Nelson, Marion, IA (US); Matthew P. Corbett, Mount Vernon, IA (US); Jason R. Owen, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 83 days.

(21) Appl. No.: 15/658,176

(22) Filed: Jul. 24, 2017

(51) Int. Cl.
*H04L 12/939* (2013.01)
*H04L 12/24* (2006.01)
*H04L 12/26* (2006.01)
*H04L 5/14* (2006.01)

(52) U.S. Cl.
CPC ........ *H04L 49/555* (2013.01); *H04L 41/0654* (2013.01); *H04L 43/0852* (2013.01); *H04L 5/14* (2013.01)

(58) Field of Classification Search
CPC .............. H04L 49/555; H04L 41/0654; H04L 41/0686; H04L 43/0852; H04L 5/14; H04L 43/106; H04L 2463/121; H04L 63/123; H04L 9/3297; H04L 41/06; H04L 43/16
See application file for complete search history.

(56) References Cited

U.S. PATENT DOCUMENTS

| 5,548,533 | A  | * | 8/1996  | Gao ................... H04Q 3/54591 455/445 |
| 8,646,090 | B1 | * | 2/2014  | Gadde ................. H04L 12/6418 726/13 |
| 8,731,036 | B2 | * | 5/2014  | Umayabashi ............. H03L 7/08 375/224 |
| 2008/0267078 | A1 | * | 10/2008 | Farinacci ............ H04L 12/1877 370/244 |
| 2012/0008641 | A1 | * | 1/2012  | Stoica ................... H04L 47/225 370/465 |
| 2012/0047505 | A1 | * | 2/2012  | Branson ................ G06F 16/254 718/100 |
| 2013/0301634 | A1 | * | 11/2013 | Ehlers ................. H04L 12/4625 370/350 |
| 2014/0150014 | A1 | * | 5/2014  | Aitken ............... H04N 21/2381 725/33 |

(Continued)

*Primary Examiner* — Hoang-Chuong Q Vu
(74) *Attorney, Agent, or Firm* — Donna P. Suchy; Daniel M. Barbieri (57) ABSTRACT

An improved AFDX switch, as described herein, can include an embedded integrity monitoring module that is functionally fault-independent of the switching module or other components of the AFDX switch. The integrity monitoring module can include a delay monitoring module for monitoring delays of data packets within the AFDX switch and/or a routing module for monitoring or detecting data packets routing errors or failures. The delay monitoring module can assign a timestamp to a data frame at arrival to the AFDX switch, determine a time delay of the data frame within the AFDX switch based on the timestamp, and compare the time delay to a threshold value to detect erroneous time delays. The routing monitoring module can compare the input port and/or the output port at which the data frame arrives while in the AFDX switch to the corresponding preassigned input port or output port to detect routing failures.

20 Claims, 4 Drawing Sheets

(56) References Cited

U.S. PATENT DOCUMENTS

2015/0113576 A1* 4/2015 Carroll ................. H04N 21/242
                                                             725/109
2017/0134538 A1* 5/2017 Mahkonen .......... H04L 12/4633
2018/0069801 A1* 3/2018 Qi ......................... H04W 56/00
2019/0041846 A1* 2/2019 Cella .................... H04L 1/0002

\* cited by examiner

HIGH INTEGRITY AFDX SWITCHES

BACKGROUND

Many new generations of commercial aircrafts support avionics full-duplex switched Ethernet (AFDX). AFDX networks usually include two types of devices; AFDX switches and AFDX end systems. AFDX end systems are associated with devices, such as sensors, radar systems, and/or electronic systems, whose applications access the AFDX network components to transmit data to or receive data from the network. AFDX switches are connected to AFDX end systems and are configured to route data between AFDX end systems by performing traffic policing and filtering. For instance, end systems can transmit data (such as sensor data, radar output data, etc.) to control systems within the airplane cockpit. The AFDX switches can route such data to guarantee that it ends up at the proper destination.

Safety is a crucial factor in operating airplanes. As such, most end systems can be equipped with corresponding integrity monitoring capabilities to timely detect any corresponding functional failures. However, AFDX switches do not include adequate integrity check capabilities that are functionally fault-independent of the corresponding AFDX switches.

SUMMARY

In one aspect, the inventive concepts disclosed herein are directed to an avionics full-duplex switched Ethernet (AFDX) switch including a switch management module to monitor a state of the AFDX switch, a switching module to perform switching functions on data processed by the AFDX switch, an integrity monitoring module configured to operate independently of the switching module, and a processing circuitry. The processing circuitry can be configured to cause the integrity monitoring module to assign a timestamp to a data frame. The timestamp can be indicative of a time of receipt of the data frame at an input port of the AFDX switch. Responsive to the switching module receiving and processing the data frame, the integrity monitoring module can determine a time delay of the data frame based on the timestamp. The time delay can include a processing time of the data frame by the switching module. The integrity monitoring module can compare the time delay to a threshold value, and responsive to determining that the time delay exceeds the threshold value, provide a failure notification to the switch management module.

The switch management module can be configured to reset the AFDX switch responsive to receipt of one or more failure notifications. The processing circuitry can be configured to cause the integrity monitoring module to discard the data frame responsive to determining that the time delay exceeds the threshold value. The processing circuitry can be configured to cause the integrity monitoring module to hash the timestamp with a cyclic redundancy check (CRC) code of the data frame at the input port of the AFDX switch, and unhash the hashed timestamp at an output port of the AFDX switch prior to determining the time delay. The processing circuitry can be configured to cause the integrity monitoring module to determine a priority class associated with the data frame, and select the threshold value among a plurality of threshold values based on the determined priority class.

The processing circuitry can be configured to cause the integrity monitoring module to compare the input port at which the data frame is received to an input port preassigned to the data frame. Responsive to determining a mismatch between the input port at which the data frame is received and the input port preassigned to the data frame, provide a failure notification to the switch management module. The processing circuitry can be configured to cause the integrity monitoring module to discard the data frame responsive to determining the mismatch between the input port at which the data frame is received and the input port preassigned to the data frame.

The processing circuitry can be configured to cause the integrity monitoring module to compare an output port of the AFDX switch at which the data frame arrives after processing by the switching module to an output port preassigned to the data frame. Responsive to determining a mismatch between the output port of the AFDX switch at which the data frame arrives after processing by the switching module and the output port preassigned to the data frame, the integrity monitoring module can provide a failure notification to the switch management module. The processing circuitry can be configured to cause the integrity monitoring module to discard the data frame responsive to determining the mismatch between the output port of the AFDX switch at which the data frame arrives after processing by the switching module and the output port preassigned to the data frame.

In a further aspect, the inventive concepts disclosed herein are directed to a method for monitoring integrity of an avionics full-duplex switched Ethernet (AFDX) switch. The method can include an integrity monitoring module of the AFDX switch assigning a timestamp to a data frame. The timestamp can be indicative of a time of receipt of the data frame at an input port of the AFDX switch. The method can include the integrity monitoring module determining a time delay of the data frame based on the timestamp, responsive to the switching module receiving and processing the data frame. The time delay can include a processing time of the data frame by the switching module. The method can include the integrity monitoring module comparing the time delay to a threshold value, and providing a failure notification to a switch management module of the AFDX switch responsive to determining that the time delay exceeds the threshold value.

The method can include the switch management module of the AFDX switch resetting the AFDX switch responsive to receipt of one or more failure notifications. The method can include the integrity monitoring module discarding the data frame responsive to determining that the time delay exceeds the threshold value. The method can include the integrity monitoring module hashing the timestamp with a cyclic redundancy check (CRC) code of the data frame at the input port of the AFDX switch, and unhashing the hashed timestamp at an output port of the AFDX switch prior to determining the time delay. The method can include the integrity monitoring module determining a priority class associated with the data frame, and selecting the threshold value among a plurality of threshold values based on the determined priority class.

The method can include the integrity monitoring module comparing the input port at which the data frame is received to an input port preassigned to the data frame. The method can include the integrity monitoring module providing a failure notification to the switch management module, responsive to determining a mismatch between the input port at which the data frame is received and the input port preassigned to the data frame. The method can include the integrity monitoring module discarding the data frame responsive to determining the mismatch between the input port at which the data frame is received and the input port preassigned to the data frame.

The method can include the integrity monitoring module comparing an output port of the AFDX switch at which the data frame arrives after processing by the switching module to an output port preassigned to the data frame. The method can include the integrity monitoring module providing a failure notification to the switch management module, responsive to determining a mismatch between the output port of the AFDX switch at which the data frame arrives after processing by the switching module and the output port preassigned to the data frame. The method can include the integrity monitoring module discarding the data frame responsive to determining the mismatch between the output port of the AFDX switch at which the data frame arrives after processing by the switching module and the output port preassigned to the data frame.

In a further aspect, the inventive concepts disclosed herein are directed to an avionics full-duplex switched Ethernet (AFDX) switch including a switch management module to monitor a state of the AFDX switch, a switching module to perform switching functions on data processed by the AFDX switch, an integrity monitoring module configured to operate independently of the switching module, and a processing circuitry. The processing circuitry can be configured to cause the integrity monitoring module to compare the input port at which a data frame is received to an input port preassigned to the data frame, responsive to receipt of a data frame at an input port of the AFDX switch. The processing circuitry can be configured to cause the integrity monitoring module to provide the data frame for processing by the switching module, responsive to determining a match between the input port at which the data frame is received and the input port preassigned to the data frame. The processing circuitry can be configured to cause the integrity monitoring module to provide an ingress failure notification to the switch management module, responsive to determining a mismatch between the input port at which the data frame is received and the input port preassigned to the data frame. The processing circuitry can be configured to cause the integrity monitoring module to compare an output port of the AFDX switch at which the data frame arrives after processing by the switching module to an output port preassigned to the data frame, responsive to processing the data frame by the switching module. The processing circuitry can be configured to cause the integrity monitoring module to provide a failure notification to the switch management module, responsive to determining a mismatch between the output port of the AFDX switch at which the data frame arrives after processing by the switching module and the output port preassigned to the data frame. The processing circuitry can be configured to cause the integrity monitoring module to transmit the data frame through the output port of the AFDX switch at which the data frame arrives after processing by the switching module, responsive to determining a match between the output port of the AFDX switch at which the data frame arrives after processing by the switching module and the output port preassigned to the data frame.

The processing circuitry is configured to cause the integrity monitoring module to perform at least one of (1) discarding the data frame responsive to determining a mismatch between the input port at which the data frame is received and the input port preassigned to the data frame, (2) resetting the AFDX switch responsive to determining a mismatch between the input port at which the data frame is received and the input port preassigned to the data frame, (3) discarding the data frame responsive to determining a mismatch between the output port of the AFDX switch at which the data frame arrives after processing by the switching module and the output port associated with the data frame, or (4) resetting the AFDX switch responsive to determining a mismatch between the output port of the AFDX switch at which the data frame arrives after processing by the switching module and the output port preassigned to the data frame.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Avionics full-duplex switched Ethernet (AFDX) networks employ AFDX communication protocols derived from commercial Ethernet technology (or standards) with added provisions for guaranteed deterministic timing and redundancy. The deterministic provisions make Ethernet more suitable for safety critical systems such as avionics applications and systems. The Aeronautical Radio, Incorporated (ARINC) 664, part 7 standard defines an architecture of AFDX networks and the AFDX communication protocols supported by AFDX networks. The ARINC 664 (also referred to herein as A664) implementation guarantees a deterministic behavior, provides improved reliability, and works well on most airplanes. However, the ARINC 664 standard and implementations thereof fail to provide adequate independent integrity for AFDX switches as desired for a safety critical system as the airplane.

In an airplane system, different devices or functional components thereof can be associated with separate amounts of safety based on respective potential failure conditions. Each failure condition can be assigned a corresponding risk category. Risk categories can include, for example, catastrophic risk, hazardous risk, major risk, minor risk, and no-effect risk. An AFDX end system within an AFDX network of an airplane, such as a sensor, radar system, electronic system, aeration system, cooling or heating system, or the like, can be associated with two corresponding subsystems. A first subsystem can be configured to perform the functions or operations the AFDX end system is supposed (or expected) to perform, and a second subsystem configured to monitor the integrity of the first subsystem (e.g., by monitoring the output or states associated with the first subsystem). The integrity monitoring subsystem is usually configured to be functionally independent of the corresponding first subsystem that performs the functions of the AFDX end system. Such design (the existence of an independent integrity monitoring subsystem) to monitor operational or functional integrity is not applied to AFDX switches.

Specifically, implementations of ARINC 664 do not provide independent integrity monitoring solutions for AFDX switches. Similar to AFDX end systems, AFDX switches can fail to function or operate as expected and therefore provide erroneous output data. For instance, an AFDX switch can delay high priority data according to the longest delay for low priority data instead of maximum acceptable delay for the high priority data. Also, data frames may arrive at the wrong input port of the AFDX switch, or may be routed to the wrong output port of the AFDX switch. Such routing failures can lead to the data packets ending up the wrong destination. Also, even the AFDX network provides redundancy such that a data frame can be routed through two (or multiple) separate paths or separate AFDX switches, the separate AFDX switches can both fail simultaneously. Also, a failure by one of the AFDX switches may still be a risk if not timely detected and addressed.

In the current disclosure, improved AFDX switches with embedded integrity monitoring capabilities are described. An AFDX can include an integrity monitoring module that is functionally (an implementation wise) fault-independent of the switching module (or switching fabric) or other components of the AFDX switch. As used herein, fault-independent (or independent) implies that a failure of the part of the switching module (or other components of the AFDX switch) will not result on functional failure of integrity monitoring module. The integrity monitoring module can include a delay monitoring module (or sub-module) for monitoring delays of data packets within the AFDX switch, a routing module for monitoring or detecting data packets routing errors or failures, or a combination thereof.

Figure 1:
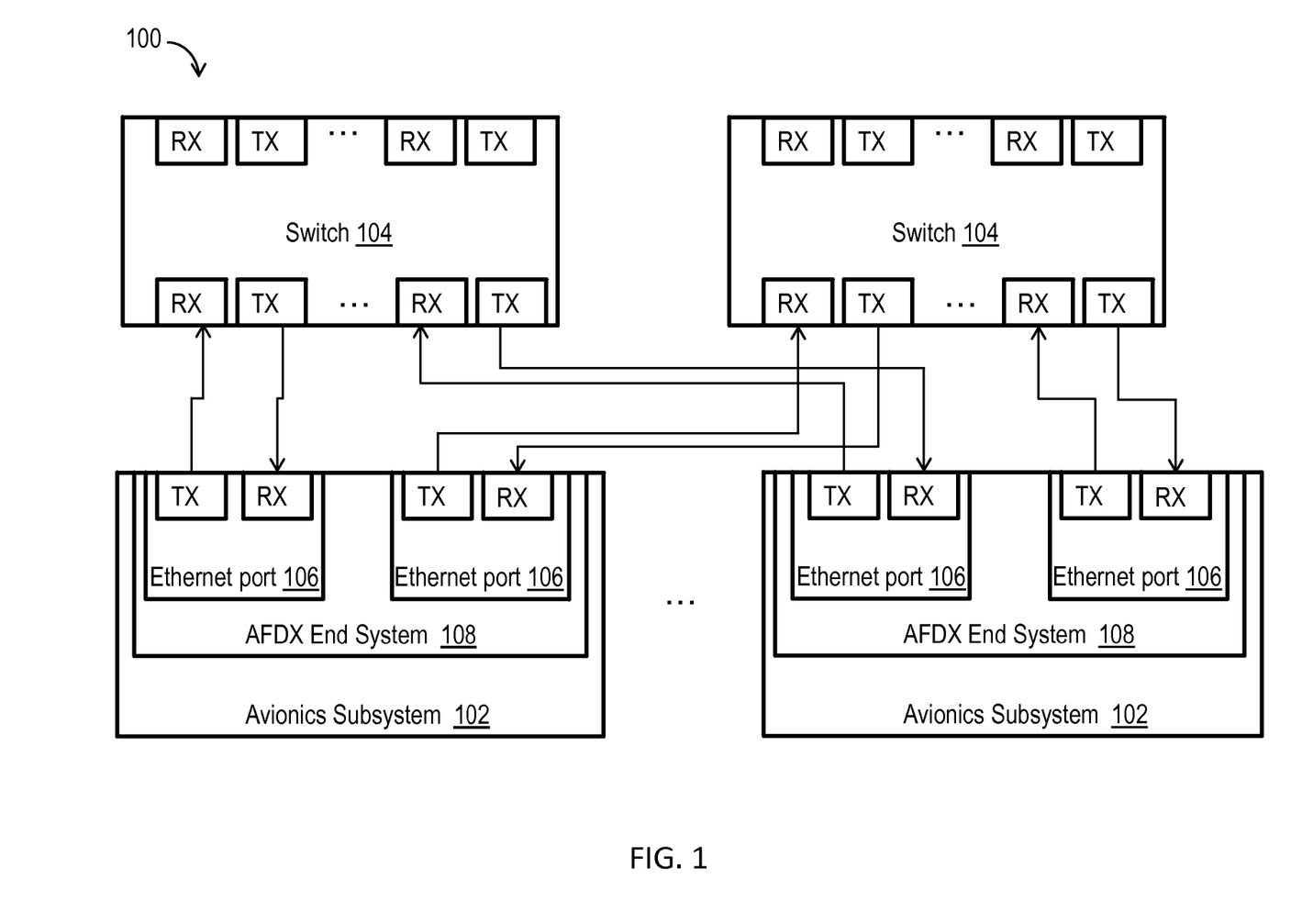
FIG. 1 shows a block diagram illustrating an example embodiment of an avionics full-duplex switched Ethernet (AFDX) network, according to inventive concepts of this disclosure.

Referring now to the drawings, FIG. 1 shows a block diagram illustrating an example embodiment of an AFDX system 100, according to inventive concepts of this disclosure. The AFDX system 100 can include a plurality of avionics subsystems 102 connected to a plurality of AFDX switches 104. Each AFDX switch 104 can be configured to route data between various avionics subsystems 102 according to a predefined AFDX related communication protocol (e.g., A664 protocol). For instance, each AFDX switch 104 can maintain a respective routing table to route data frames (or data packets) between various avionics subsystems 102.

Each avionics subsystem 102 can be an electronic device (or electronic system) fitted to an aircraft to perform a specific function, such as a weather radar, lighting detector, navigation system, traffic alert and collision avoidance system TCAS, ground-proximity warning system (GPWS), black box, a glass cockpit, aircraft flight-control system, the like, or a combination thereof. The electronics systems or devices can exchange data in performing respective functions. For example, the weather radar, the lightning detector, the navigation system, the TCAS or the GPWS may be configured to periodically report measured data or detected events to glass cockpits or the aircraft flight-control system. Considering the typically large number of avionics subsystems 102 in an aircraft, relying on physical links between each pair of avionics subsystems 102 communicating to one another can result in complex wiring. The AFDX system 100 allows for establishing VLs between avionics subsystems 102 communicating to one another.

Each avionics subsystem 102 can include an Ethernet port 106 for transmitting data to, or receiving data from, other avionics subsystems 102. Each Ethernet port 106 can include a transmit port and a receive port, or can include a port acting both as a transmit and a receive port. Each avionics subsystem 102 can include two (or multiple) Ethernet ports 106 to allow for redundant transmission of data. For example, the avionics subsystem 102 can transmit a data frame over two separate transmit ports to be routed over two separate communication routes. For instance, separate Ethernet ports 106 of an avionics subsystem can be connected to separate switches 104, respectively. The redundancy in data transmission allows for resilience against lost data frames (or data packets).

The avionics subsystem 102 can also include an AFDX end system 106 for handling communications with other avionics subsystems 102. Each AFDX end system 106 of an avionics subsystem 102 can establish and handle VLs with other avionics subsystem 102. For each data frame associated with a respective VL, the AFDX end system 106 can insert the corresponding VLID in the data frame. Each AFDX end system 106 can be viewed as an AFDX communication interface configured to handle communications for the corresponding avionics subsystem 102. The AFDX end system 106 can include a processor (e.g., a central processing unit (CPU), a microprocessor, a digital signal processor (DSP), a multi-core processor, a network processor, or the like), a microcontroller, an application-specific integrated circuit (ASIC), a field-programmable gate array (FPGA), a memory, or a combination thereof. The memory can maintain data queues of data frames (or data packets) or store computer code instructions to be executed by the processor. The computer code instructions, when executed by the processor, can cause the processor to generate data frames (e.g., with respective headers conforming to supported communication protocols), schedule data frames for transmission, transmit the data frames according a scheduling scheme, or a combination thereof.

Figure 2:
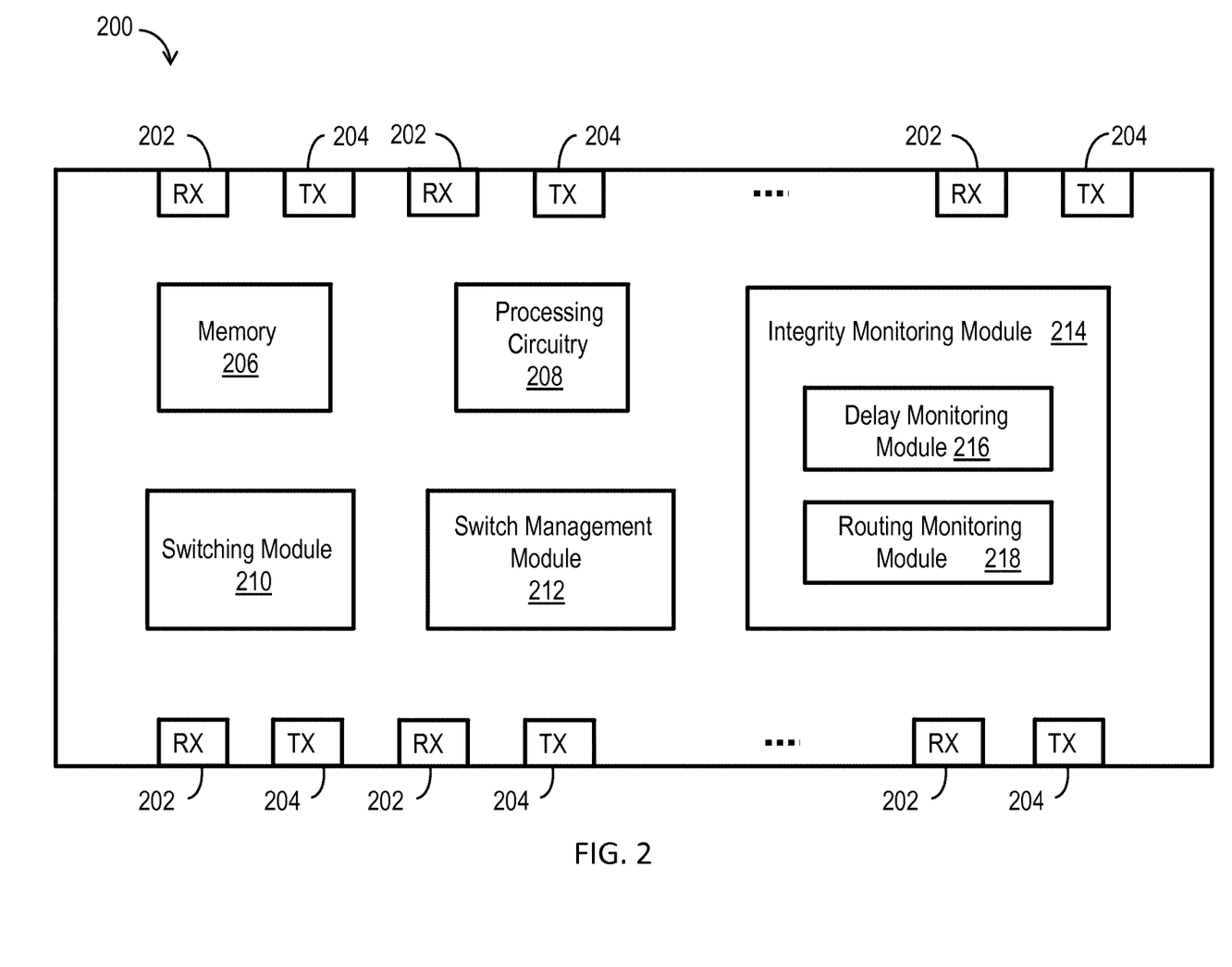
FIG. 2 shows a block diagram illustrating an example embodiment of an AFDX switch, according to inventive concepts of this disclosure.

Referring to FIG. 2, a block diagram illustrating an example embodiment of an AFDX switch 200, according to inventive concepts of this disclosure. In brief overview, the AFDX switch 200 can include a plurality of receive (RX) ports (or input ports) 202, a plurality of transmit (TX) ports (or output ports) 204, a memory 206, processing circuitry 208, a switching module 210 (also referred to as switch fabric 210), a switch management module 212, and an integrity monitoring module 214. The integrity monitoring module 214 can include a delay monitoring module 216, a routing monitoring module 218, or a combination thereof. The RX ports 202, as the name implies, can receive data frames from AFDX end systems 106 or other AFDX switches. The AFDX switch 200 can transmit data frames through the respective TX ports 204 to AFDX end systems 106 or other AFDX switches. In some implementations, the AFDX switch 200 can include communication ports configured to operate as both RX and TX ports.

The memory 206 can store information for use in processing data frames by the AFDX switch 200. For instance, for each VL, the memory 206 can store a VLID, a RX port 202 assigned to that VL, a TX port 204 assigned to that VL, a bandwidth allocation gap (BAG), frame size, maximum allowed jitter, account type, priority information or combination thereof. The memory 206 can store switch integrity information such as threshold values, failure messages, or a combination thereof. The memory 206 can store executable instructions for execution by the processing circuitry 208. The executable instructions can include instructions to perform integrity functions associated with the AFDX switch 200, such as instructions for performing switching operations associated with the switching module 210, instructions for performing operations associated with the switch management module 212, instructions for performing operations associated with the integrity monitoring module 214, or a combination thereof.

The processing circuitry 208 can include a processor (e.g., a central processing unit (CPU), a microprocessor, a digital signal processor (DSP), a multi-core processor, a network processor, or the like), a microcontroller, an application-specific integrated circuit (ASIC), a field-programmable gate array (FPGA), or a combination thereof. The processing circuitry 208 can execute executable instructions stored in the memory 206, perform switching operations associated with the switching module 210, perform operations associated with the switch management module 212, perform operations associated with the integrity monitoring module 214, or a combination thereof.

The switching module 210 can be configured to process received data frames, for example, by performing data frame filtering and traffic policing. The switching module 210 can parse the header of each received data frame and retrieve the respective virtual link identifier (VLID). The switching module 210 can retrieve virtual link (VL) parameters, such as input port, output port, maximum data frame size, data rate, and priority assigned to the VL associated with the data frame, from memory 206 based on the VLID. The switching module 210 can then check, for example, whether the frame size and a measured data rate conform with the maximum frame size and data rate assigned to the VLID. If the checks succeed, the switching module 210 can provide the data frame according to the assigned priority to the output port assigned to the VLID.

The switch management module 212 can be configured to monitor the state of operation of the AFDX switch 200. For instance, the switch management module 212 can monitor whether the AFDX switch is operating (e.g., with regard to switching functions and processing time) as it is expected to do. The switch management module 212 can be configured to report the state of the AFDX switch 200 to a health monitoring system. The switch management module 212 can be configured to reset the AFDX switch in case of undesired state of operation of the AFDX switch 200.

The integrity monitoring module 214 can be configured to monitor the integrity of the AFDX switch 200 and report any detected failures to the switch management module 212. The integrity monitoring module 214 can include a delay monitoring module 216, a routing monitoring module 218, or a combination thereof. The delay monitoring module 216 can be configured to monitor data frames' delays within the AFDX switch. The routing monitoring module 218 can be configured to monitor routing of data frames within the AFDX switch. Methods performed by the delay monitoring module 216 and the routing monitoring module 218 are described in further detail below with regard to FIGS. 3 and 4, respectively. The integrity monitoring module 214 can be configured to operate independently of the switching module 210. Specifically, a failure (or unsatisfactory operation) of the switching module 210 does not affect the operation of the integrity monitoring module 214.

The switching module 210, the switch management module 212, and/or the integrity monitoring module 214 can be implemented as software, hardware, firmware, or a combination thereof. For instance, each of these modules may be implemented as executable instructions that are stored in the memory 206 and executed by the processing circuitry 208. Each of these modules may be implemented as hardware, for example, using transistors, comparators, diodes, integrated circuits, or a combination thereof. Each of these modules may be implemented using one or more microcontrollers, an ASIC, a FPGA, or a combination thereof. Each of these modules may be implemented using a combination of software and hardware such that a first portion of operations associated with the module is implemented as executable instructions while a second portion is implemented as one or more integrated circuits. Each of these modules can be partially or completely included in the processing circuitry 208, or can be a separate component communicatively coupled to the processing circuitry 208.

Figure 3:
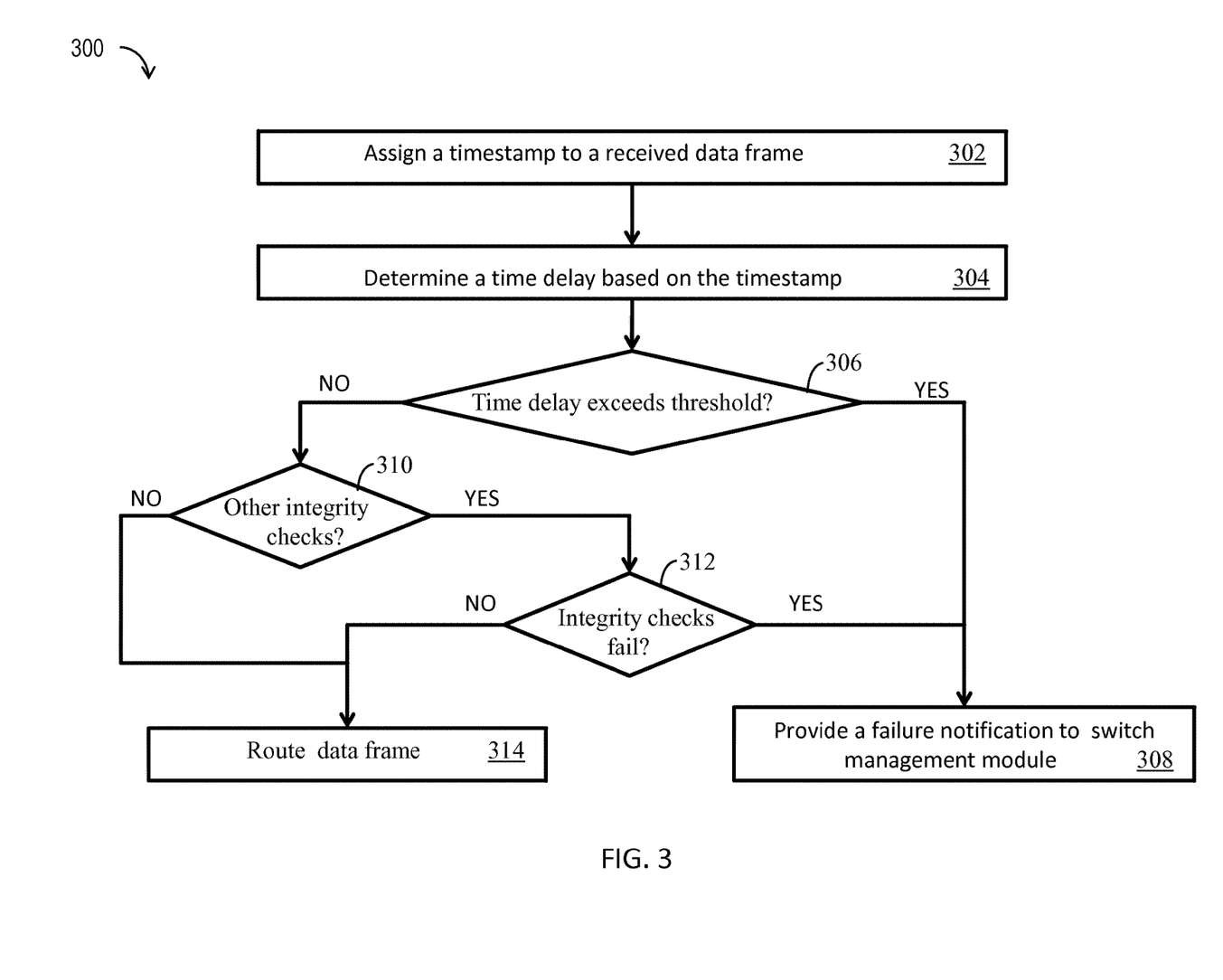
FIG. 3 shows a flowchart illustrating an example embodiment of a method of monitoring data frame time delays within an AFDX switch, according to inventive concepts of this disclosure.

Referring to FIG. 3, a flowchart illustrating an example embodiment of a method 300 of monitoring data frame time delays within an AFDX switch is shown, according to inventive concepts of this disclosure. In brief overview, the method 300 can include assigning a timestamp to a data frame received by the AFDX switch (step 302), and determining a time delay of the data frame based on the assigned timestamp, upon processing of the data frame by the switching module 210 (step 304). The method 300 can include comparing the time delay to a threshold value (decision block 306), and providing a failure notification (or message) to the switch management module 212 responsive to the time delay exceeding the threshold value (step 308). The method 300 can include performing additional integrity checks, if any, (decision block 310), and providing failure notification(s) (or message(s)) to the switch management module 212 (step 308), responsive to any of such integrity checks failing (decision block 312). The method 300 can include routing the data frame (step 314) if no additional integrity checks are performed (decision block 310) or additional integrity checks succeed (decision block 312).

The method 300 can include assigning a timestamp to a data frame received by the AFDX switch (step 302). Upon receipt of the data frame at an input port 202 of the AFDX switch 200, the processing circuitry 208, or the delay monitoring module 216, can assign a timestamp to the data frame indicative of the time of arrival of the data frame at the AFDX switch 200 or the respective input port 202. At the time receipt of the data frame at the input port 202 is detected, processing circuitry 208, or the delay monitoring module 216, can determine the data frame time of arrival using a clock signal associated with the AFDX switch 200 (or accessible to the AFDX switch 200). The processing circuitry 208, or the integrity monitoring module 214, can generate a timestamp indicative of the determined time of arrival.

The processing circuitry 208, or the delay monitoring module 216, may insert (or embed) the timestamp into a header field of the data frame. The processing circuitry 208, or the delay monitoring module 216, may hash the generated timestamp with a cyclic redundancy check (CRC) code of the data frame before inserting the timestamp into the header field of the data frame, and insert the hashed timestamp into the header field. Hashing the time stamp can prevent the switching module 210 (or any other component of the AFDX switch 200) from modifying or corrupting the generated timestamp, or at least allow detection of such modification or corruption if it happens.

Upon generating and inserting the timestamp within the data frame, the processing circuitry 208, or the delay monitoring module 216, can provide the data frame to the switching module 210 for processing. The processing circuitry 208, or the switching module 210, can parse the header of the data frame to identify a communication flow (e.g., a VL) associated with the data frame. For instance, the processing circuitry 208, or the switching module 210, can retrieve a VLID from the data frame header. The processing circuitry 208, or the switching module 210, can determine switching parameters assigned to the VL corresponding to the data frame based on the retrieved VLID. The processing circuitry 208, or the switching module 210, can read such parameters from memory 206 using the retrieved VLID. The switching parameters can include an input port 202, an output port 204, a data rate, a maximum data frame size, a priority value, or a combination thereof assigned to the VL corresponding to the retrieved VLID. The processing circuitry 208, or the switching module 210, can perform a number of checks associated with the data frame based on the switching parameters assigned to the VL corresponding to the data frame. If all the checks succeed, the switching module 210, can provide the data frame to the delay monitoring module 216 for integrity check prior to passing the data frame to the output port 204 assigned to the VLID.

The method 300 can include the processing circuitry 208 or the delay monitoring module 216 determining a time delay of the data frame based on the assigned timestamp, upon processing of the data frame by the switching module 210 (step 304). For instance, upon the switching module 210 successfully completing all checks for the data frame, the processing circuitry 208 or the delay monitoring module 216 can retrieve the timestamp from the data frame. If the timestamp was hashed, the processing circuitry 208 or the delay monitoring module 216 can unhash the timestamp using the CRC code of the data frame. The processing circuitry 208 or the integrity monitoring module 214 can determine a time value indicative, for example, of the time instant at which the switching module 210 completed processing of the data frame or the time instant at which the delay monitoring module 216 received the data frame after processing by the switching module 210. The processing circuitry 208 or the delay monitoring module 214 can determine the time value using a clock signal associated with the AFDX switch 200 (or accessible to the AFDX switch 200). The processing circuitry 208 or the delay monitoring module 214 can subtract the time value store in (or encoded in) the time stamp from the time value determined after processing of the data frame by the switching module 210 to determine the time delay of the data frame. The time delay can include the processing time during which the data frame was processed by the switching module 210. The time delay of the data frame may be indicative of the time duration the data frame spent within the AFDX switch before the data frame is passed to an output port 204 of the AFDX switch 200.

The method 300 can include the processing circuitry 208 or the delay monitoring module 216 comparing the determined data frame time delay to a threshold value (decision block 306). The threshold value can be indicative of a maximum time delay acceptable for the data frame or the corresponding VL. The threshold value can be specific to the VL corresponding to the data frame or a priority class associated with that VL. For instance, a separate threshold value can be assigned to each VL or each priority class. Each VL can be associated with a corresponding priority class. A priority class indicative of high priority data can be assigned a smaller threshold value than a threshold value assigned to another priority class that is indicative of lower priority data.

The processing circuitry 208 or the delay monitoring module 216 can determine the priority class associated with the data frame, for example, based on the priority value associated with the VLID retrieved from the data frame. The priority value can be indicative of the priority class assigned to the VL identified by the VLID. The processing circuitry 208 or the delay monitoring module 216 can determine a threshold value among a plurality of threshold values based on the priority class associated with the data frame or the corresponding VL. For instance, the memory 206 may store a data structure including an indicator for each priority class of the plurality of priority classes that is linked or mapped to the corresponding threshold value. The memory 206 may store a threshold value linked to each VLID of a plurality of VLIDs. The processing circuitry 208 or the delay monitoring module 216 can retrieve the threshold value associated with the data frame from memory 206 based on the VLID retrieved from the data frame or the priority class assigned to that VLID. The processing circuitry 208 or the delay monitoring module 216 can then compare the data frame time delay to the threshold value determined to be associated with the data frame.

The method 300 can include the processing circuitry 208 or the delay monitoring module 216 providing a failure notification to the switch management module 212 responsive to the time delay exceeding the threshold value (step 308) responsive to determining that the time delay exceeds the threshold value at decision block 306. The failure notification can include a text message, a code, or signal indicative of a switch failure (e.g., non-specific failure), a time delay failure (e.g., specific failure), the priority class of the data frame, or a combination thereof The switch management module 212 may determine a risk category associated with the time delay failure based on the received failure notification. The risk category may depend on the priority class associated with data frame, the source of the data frame, the type of data carried by the data frame, or a combination thereof. The switch management module 212 may reset (or switch off) the AFDX switch 200 responsive to one or more failure notifications received from that AFDX switch. The switch management module 212 may decide to reset the AFDX switch 200 based on the severity category associated with the received failure notification, a number of failure notifications received from the AFDX switch 200 (e.g., since a last reset or within a predefined time window), or a combination thereof.

The processing circuitry 208 or the integrity monitoring module 214 may discard the data frame responsive to determining that the data frame time delay exceeds the threshold value at decision block 306. Discarding the data frame includes dropping the data frame and not passing it to the output port 204 assigned to the corresponding VLID. The processing circuitry 208 or the integrity monitoring module 214 may decide whether or not to discard the data frame based on, for example, the priority class associated with the data frame, the difference between the data frame delay and the threshold value (e.g. by how much the threshold value is exceeded), the source of the data frame, the type of data carried by the data frame or a combination thereof.

The method 300 can include performing additional integrity checks, if any, (decision block 310), and providing failure notification(s) (or message(s)) to the switch management module 212 (step 308), responsive to any of such integrity checks failing (decision block 312). The processing circuitry 208 or the integrity monitoring module 214 can perform additional integrity checks (e.g., ingress and/or egress routing integrity checks described below with regard to FIG. 4 or other integrity checks). While decision blocks 310 and 312 are shown to occur after decision block 306, in general, the processing circuitry 208 or the integrity monitoring module 214 can perform the additional integrity checks prior to, simultaneously with, or subsequent to any of the steps of method 300. If any of the additional integrity checks fails at decision block 312, the processing circuitry 208 or the integrity monitoring module 214 can provide a corresponding failure notification to the switch management module 212.

The method 300 can include routing the data frame (step 314) if no additional integrity checks are performed at decision block 310 or all additional integrity checks succeed (e.g., no failure of the AFDX switch 200) at decision block 312. Routing the data frame can include providing the data frame to the output port 204 of the AFDX switch 200 assigned to the data frame or the corresponding VL. The output port 204 can transmit the data frame to an AFDX end system 106 or another AFDX switch 200.

Figure 4:
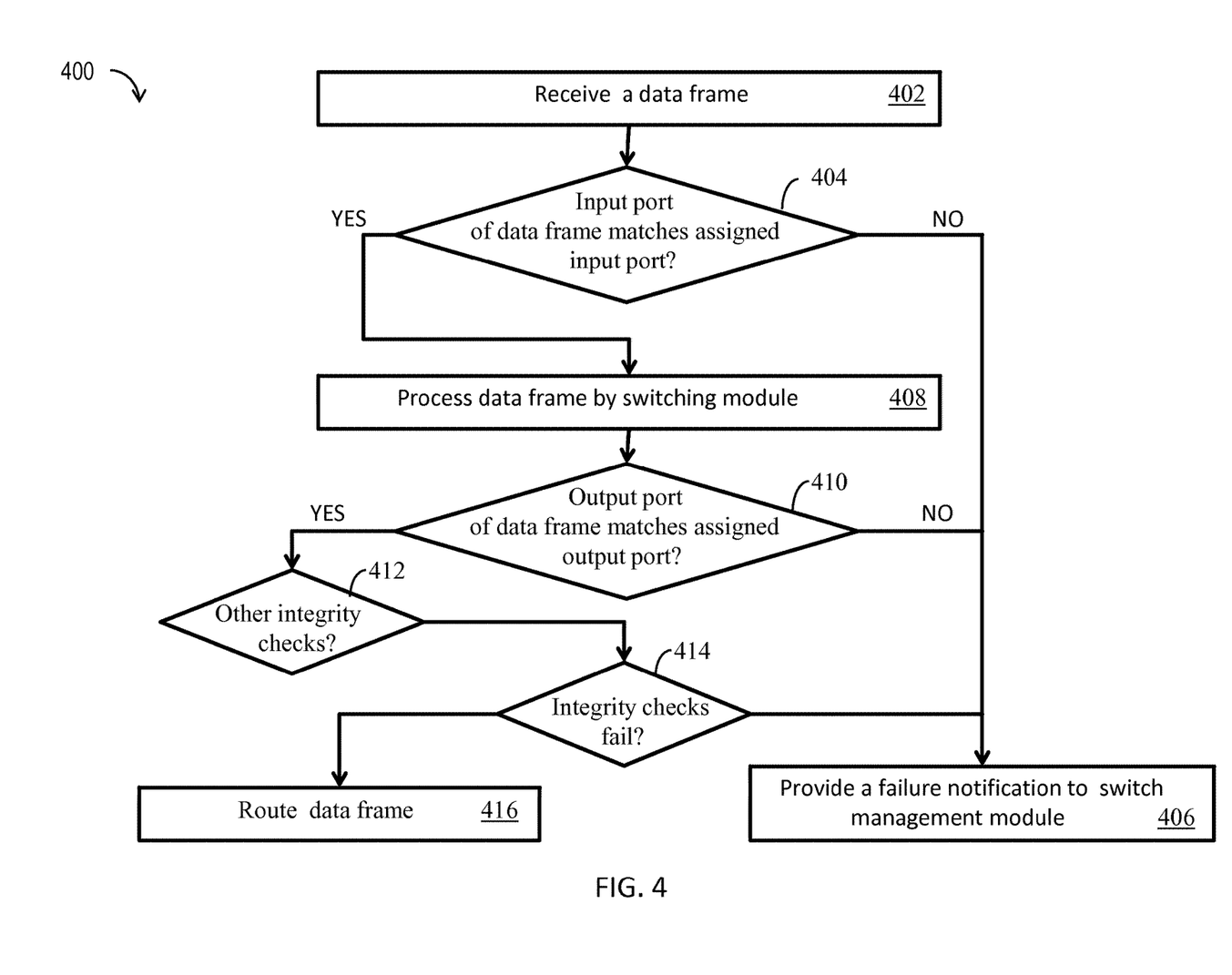
FIG. 4 shows a flowchart illustrating an example embodiment of a method of monitoring data frame routing failures within an AFDX switch, according to inventive concepts of this disclosure.

Referring to FIG. 4, a flowchart illustrating an example embodiment of a method 400 of monitoring data frame routing failures within AFDX switch 200 is shown, according to inventive concepts of this disclosure. In brief overview, the method 400 can include receiving a data frame at an input port 202 of the AFDX switch (step 402), and comparing the input port 202 at which the data frame is received to an input port 202 preassigned to the data frame (decision block 404). The method 400 can include providing a failure notification (or message) to the switch management module 212 responsive to the comparison at decision block 304 resulting in mismatch (step 406). The method 400 can include providing the data frame for processing by the switching module 210 responsive to a match at decision block 404 (step 408), and comparing an output port 204 of the AFDX switch 200 at which the data frame ends up after processing by the switching module 210 to an output port 204 preassigned to the data frame (decision block 410). The method 400 can include providing a failure notification (or message) to the switch management module 212 responsive to a mismatch at decision block 410 (step 406). The method 400 can include performing additional integrity checks, if any, (decision block 412), and providing failure notification (s) (or message(s)) to the switch management module 212 (step 406), responsive to any of such integrity checks failing (decision block 414). The method 400 can include routing the data frame (step 416) if no additional integrity checks are performed (decision block 412) or all additional integrity checks succeed at decision block 414.

The method 400 can include receiving a data frame at an input port 202 of the AFDX switch (step 402). Responsive to receipt of the data frame, the processing circuitry 208, or the routing monitoring module 218, can parse the header of the data frame to identify a communication flow (e.g., a VL) associated with the data frame. For instance, the processing circuitry 208, or the routing monitoring module 218, can retrieve a VLID from the data frame header. If the VLID was previously retrieved, the routing monitoring module 218 can access the VLID from a corresponding memory location. The processing circuitry 208, or the routing monitoring module 218, can determine switching parameters assigned to the VL corresponding to the data frame based on the retrieved VLID. The processing circuitry 208, or the routing monitoring module 218, can read such parameters from memory 206 using the retrieved VLID. The switching parameters can include an input port 202, an output port 204, a priority value, or a combination thereof preassigned to the VL corresponding to the retrieved VLID.

The method 400 can include comparing the input port 202 at which the data frame is received to an input port 202 preassigned to the data frame (decision block 404), and providing a failure notification (or message) to the switch management module 212 responsive to a mismatch between both input ports 202 (step 406). The mismatch between the input ports can indicate that data frame arrived at the wrong input port of the AFDX switch 200 or at the wrong AFDX switch 200. The failure notification can include a text message, a code, or signal indicative of a switch failure (e.g., non-specific failure), an ingress routing failure (e.g., specific failure), the priority class of the data frame, or a combination thereof.

The switch management module 212 may determine a risk category associated with the time delay failure based on the received failure notification. The risk category may depend on the priority class associated with data frame, the source of the data frame, the type of data carried by the data frame, or a combination thereof. The switch management module 212 may reset (or switch off) the AFDX switch 200 responsive to one or more failure notifications received from that AFDX switch 200. The switch management module 212 may decide to reset the AFDX switch 200 based on the severity category associated with the received failure notification, a number of failure notifications received from the AFDX switch 200 (e.g., since a last reset or within a predefined time window), or a combination thereof. The processing circuitry 208 or the routing monitoring module 218 may discard the data frame responsive to determining a mismatch between the preassigned input port 202 and the actual input port 202 at decision block 404. Discarding the data frame can include dropping the data frame and not passing it to the switching module 210 for processing.

The method 400 can include providing the data frame for processing by the switching module 210 responsive to a match at decision block 404 (step 408), and comparing an output port 204 of the AFDX switch 200 at which the data frame ends up after processing by the switching module 210 to an output port 204 preassigned to the data frame (decision block 410). The switching module 210 can perform one or more traffic policing checks on the data frame as discussed above with regard to FIG. 3. If any of the policing checks fails, the switching module 210 may discard the data frame. However, if all the policing checks succeed, the switching module 210 can provide (or make available) the data frame to an output port 204 of the AFDX switch 200. While the data frame is expected to end up at the corresponding preassigned output port 204, a failure on the part of the switching module 210 or other component of the AFDX switch 200 may occur causing the data frame to end up at another output port 204. The routing monitoring module 218 can compare the output port 204 at which the data frame ends after processing by the switching module 210 to the output port 204 preassigned to the data frame or the corresponding VL. As discussed above, the preassigned output port 204 can be determined from data linked to the retrieved VLID within the memory 206.

The method 400 can include providing a failure notification (or message) to the switch management module 212 responsive to a mismatch at decision block 410 (step 406). The failure notification can include a text message, a code, or signal indicative of a switch failure (e.g., non-specific failure), an egress routing failure (e.g., specific failure), the priority class of the data frame, or a combination thereof. The switch management module 212 may determine a risk category associated with the time delay failure based on the received failure notification. The risk category may depend on the priority class associated with data frame, the source of the data frame, the type of data carried by the data frame, or a combination thereof. The switch management module 212 may reset (or switch off) the AFDX switch 200 responsive to one or more failure notifications received from that AFDX switch 200. The switch management module 212 may decide to reset the AFDX switch 200 based on the severity category associated with the received failure notification, a number of failure notifications received from the AFDX switch 200 (e.g., since a last reset or within a predefined time window), or a combination thereof. The processing circuitry 208 or the routing monitoring module 218 may discard the data frame responsive to determining a mismatch at decision block 410. Discarding the data frame can include dropping the data frame and not proceeding with transmitting the data frame via any output port 204 of the AFDX switch 200.

The method 400 can include performing additional integrity checks, if any, (decision block 412), and providing failure notification(s) (or message(s)) to the switch management module 212 (step 406), responsive to any of such integrity checks failing (decision block 414). The processing circuitry 208 or the integrity monitoring module 214 can perform additional integrity checks (e.g., a delay integrity check as described above with regard to FIG. 3 or other integrity checks). While decision blocks 412 and 414 are shown to occur after decision block 410, in general, the processing circuitry 208 or the integrity monitoring module 214 can perform the additional integrity checks prior to, simultaneously with, or subsequent to any of the steps of method 400.

If any of the additional integrity checks fails at decision block 312, the processing circuitry 208 or the integrity monitoring module 214 can provide a corresponding failure notification to the switch management module 212. The method 400 can include routing the data frame (step 416) if no additional integrity checks are performed at decision block 316 or all additional integrity checks succeed (e.g., no failure of the AFDX switch 200) at decision block 414. Routing the data frame can include transmitting the data frame to an AFDX end system 106 or another AFDX switch 200 via the output port 204 at which the data frame arrived after processing by the switching module 210.

While methods 300 and 400 are described above as separate methods, the integrity monitoring module 214 can be configured to perform any combination of steps or integrity checks associated with method 300 and/or method 300. For instance, the integrity monitoring module 214 can be configured to perform any combination of the delay integrity check (decision block 306), ingress routing integrity check (decision block 404), egress routing integrity check (decision block 410), and any steps following such checks discussed above.

The construction and arrangement of the systems and methods are described herein as illustrative examples and are not to be construed as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method of operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. An avionics full-duplex switched Ethernet (AFDX) switch comprising:
   a switch management module to monitor a state of the AFDX switch;
   a switching module to perform switching functions on data processed by the AFDX switch;
   an integrity monitoring module configured to operate independently of the switching module; and
   a processing circuitry configured to cause the integrity monitoring module to:
      assign a timestamp to a data frame, the timestamp indicative of a time of receipt of the data frame at an input port of the AFDX switch;
      responsive to the switching module receiving and processing the data frame, determine a time delay of the data frame based on the timestamp, the time delay including a processing time of the data frame by the switching module;
      compare the time delay to a threshold value; and
      responsive to determining that the time delay exceeds the threshold value, provide a failure notification to the switch management module.

2. The AFDX switch of claim 1, wherein the processing circuitry is configured to cause the integrity monitoring module to discard the data frame responsive to determining that the time delay exceeds the threshold value.

3. The AFDX switch of claim 1, wherein the processing circuitry is configured to cause the integrity monitoring module to:
   hash the timestamp with a cyclic redundancy check (CRC) code of the data frame at the input port of the AFDX switch; and
   unhash the hashed timestamp at an output port of the AFDX switch prior to determining the time delay.

4. The AFDX switch of claim 1, wherein the processing circuitry is configured to cause the integrity monitoring module to:
   determine a priority class associated with the data frame; and select the threshold value among a plurality of threshold values based on the determined priority class.

5. The AFDX switch of claim 1, wherein the processing circuitry is configured to cause the integrity monitoring module to:
compare the input port at which the data frame is received to an input port preassigned to the data frame; and
responsive to determining a mismatch between the input port at which the data frame is received and the input port preassigned to the data frame, provide another failure notification to the switch management module.

6. The AFDX switch of claim 5, wherein the processing circuitry is configured to cause the integrity monitoring module to discard the data frame responsive to determining the mismatch between the input port at which the data frame is received and the input port preassigned to the data frame.

7. The AFDX switch of claim 1, wherein the processing circuitry is configured to cause the integrity monitoring module to:
compare an output port of the AFDX switch at which the data frame arrives after processing by the switching module to an output port preassigned to the data frame; and
responsive to determining a mismatch between the output port of the AFDX switch at which the data frame arrives after processing by the switching module and the output port preassigned to the data frame, provide another failure notification to the switch management module.

8. The AFDX switch of claim 7, wherein the processing circuitry is configured to cause the integrity monitoring module to discard the data frame responsive to determining the mismatch between the output port of the AFDX switch at which the data frame arrives after processing by the switching module and the output port preassigned to the data frame.

9. The AFDX switch of claim 1, wherein the processing circuitry is configured to cause the integrity monitoring module to reset the AFDX switch responsive to receipt of one or more failure notifications.

10. A method for monitoring integrity of an avionics full-duplex switched Ethernet (AFDX) switch comprising:
assigning, by an integrity monitoring module of the AFDX switch, a timestamp to a data frame, the timestamp indicative of a time of receipt of the data frame at an input port of the AFDX switch;
responsive to a switching module receiving and processing the data frame, determining, by the integrity monitoring module, a time delay of the data frame based on the timestamp, the time delay including a processing time of the data frame by the switching module;
comparing, by the integrity monitoring module, the time delay to a threshold value;
and responsive to determining that the time delay exceeds the threshold value, providing, by the integrity monitoring module, a failure notification to a switch management module of the AFDX switch.

11. The method of claim 10 further comprising discarding the data frame responsive to determining that the time delay exceeds the threshold value.

12. The method of claim 10 further comprising:
hashing the timestamp with a cyclic redundancy check (CRC) code of the data frame at the input port of the AFDX switch; and
unhashing the hashed timestamp at an output port of the AFDX switch prior to determining the time delay.

13. The method of claim 10 further comprising:
determining a priority class associated with the data frame; and
selecting the threshold value among a plurality of threshold values based on the determined priority class.

14. The method of claim 10 further comprising:
comparing the input port at which the data frame is received to an input port preassigned to the data frame; and
responsive to determining a mismatch between the input port at which the data frame is received and the input port preassigned to the data frame, providing another failure notification to the switch management module.

15. The method of claim 14 further comprising discarding the data frame responsive to determining the mismatch between the input port at which the data frame is received and the input port preassigned to the data frame.

16. The method of claim 10 further comprising:
comparing an output port of the AFDX switch at which the data frame arrives after processing by the switching module to an output port preassigned to the data frame; and
responsive to determining a mismatch between the output port of the AFDX switch at which the data frame arrives after processing by the switching module and the output port preassigned to the data frame, providing another failure notification to the switch management module.

17. The method of claim 16 further comprising discarding the data frame responsive to determining the mismatch between the output port of the AFDX switch at which the data frame arrives after processing by the switching module and the output port preassigned to the data frame.

18. The method of claim 10 further comprising resetting the AFDX switch responsive to one or more failure notifications.

19. The method of claim 14 further comprising resetting the AFDX switch responsive to one or more failure notifications.

20. The method of claim 16 further comprising resetting the AFDX switch responsive to one or more failure notifications.

* * * * *